United States Patent
Witty et al.

(10) Patent No.: US 8,041,010 B2
(45) Date of Patent: *Oct. 18, 2011

(54) SPLITTER CARD WITH INTEGRAL TEST ACCESS

(75) Inventors: Amy J. Witty, Prior Lake, MN (US); Glen Backes, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/690,135

(22) Filed: Jan. 20, 2010

(65) Prior Publication Data

US 2010/0232596 A1 Sep. 16, 2010

Related U.S. Application Data

(63) Continuation of application No. 12/121,079, filed on May 15, 2008, now Pat. No. 7,660,396, which is a continuation of application No. 11/467,339, filed on Aug. 25, 2006, now Pat. No. 7,376,219, which is a continuation of application No. 09/947,936, filed on Sep. 5, 2001, now Pat. No. 7,103,150.

(51) Int. Cl.
*H04M 3/22* (2006.01)
*H04M 3/08* (2006.01)
*H04M 1/24* (2006.01)

(52) U.S. Cl. .... 379/15.01; 379/9; 379/26.01; 379/27.07

(58) Field of Classification Search ................. 379/1.01, 379/1.03, 9, 15.01, 26.01, 27.01, 28, 327, 379/377, 166, 399.01, 413.02, 413.04, 27.07; 370/228

See application file for complete search history.

(56) References Cited

U.S. PATENT DOCUMENTS

| | | | |
|---|---|---|---|
| 5,546,282 A | 8/1996 | Hill | |
| 6,453,015 B1 | 9/2002 | Benedict | |
| 6,535,581 B2 | 3/2003 | Singaliese | |
| 6,594,343 B1* | 7/2003 | Duffie et al. | 379/1.01 |
| 6,782,097 B2 | 8/2004 | Witty | |
| 6,785,325 B1* | 8/2004 | Liu et al. | 375/220 |
| 7,099,313 B2* | 8/2006 | Czerwiec et al. | 370/359 |
| 7,103,150 B2 | 9/2006 | Witty | |
| 7,463,722 B2* | 12/2008 | Swam et al. | 379/15.01 |
| 2002/0041676 A1 | 4/2002 | DeCramer | |
| 2002/0118820 A1 | 8/2002 | Sinclair, III | |
| 2002/0196908 A1 | 12/2002 | Hollenbeck | |
| 2009/0060146 A1* | 3/2009 | Swam et al. | 379/22 |
| 2009/0068893 A1* | 3/2009 | Busse et al. | 439/620.22 |

OTHER PUBLICATIONS

"BroadWire™ 120: High Density ADSL Splitter", *ADC Telecommunications, Inc.*, Sep. 2000, 8 pages.

*Primary Examiner* — Binh Tieu

(74) *Attorney, Agent, or Firm* — Merchant & Gould P.C.

(57) ABSTRACT

A splitter card having integral test access devices. The splitter card allows test access to be readily provided at any location where splitter cards are typically mounted (e.g., a splitter chassis).

6 Claims, 8 Drawing Sheets

OTHER PUBLICATIONS

"BroadWire™ 240: High Density ADSL Splitter", *ADC Telecommunications, Inc.*, Sep. 2000, 8 pages.

"BroadWire™ 528: High Density ADSL Splitter",*ADC Telecommunications, Inc.*, Sep. 2000, 8 pages.

"BroadWire™ 528-Port Test Access Panel Installation Guide and Cable Routing Guide", *ADC Brochure*, ADCP-61-209, Issue 1, Feb. 2001, pp. 1-10.

"DSL POTS Splitter Shelf Family", *Corning Cable Systems LLC*, Sep. 2000, 8 pages. "High Density xDSL Central Office Splitter: PS-1000 Series", *Wilcom*, Apr. 2000, 2 pages.

"Product Release: Wilcom Announces Highest Density CO ADSL POTS Splitter Series", *Wilcom*, Nov. 6, 2000, 2 pages.

"PS-1103 ADSL Central Office Line Filter Shelf: Quick Step Installation Instructions for PS-1103 Shelf", *Wilcom*, Jun. 2000, 2 pages.

"PS-1103 CO POTS Splitter: High Density xDSL Central Office Splitter", *Wilcom*, Jul. 2000, 2 pages.

"PS-1103 CO POTS Splitter: High Density xDSL Central Office Splitter", *Wilcom*, Nov. 2000, 2 pages.

ADC Brochure, "BroadWire™ 528-Port Test Access Panel Installation Guide and Cable Routing Guide", ADCP-61-209, Issue 1, Feb. 2001, pp. 1-10.

U.S. Appl. No. 09/661,929, filed Sep. 14, 2000.

* cited by examiner

SPLITTER CARD WITH INTEGRAL TEST ACCESS

FIELD OF THE INVENTION

The present invention relates generally to telecommunications equipment. More particularly, the present invention relates to telecommunications equipment used in twisted pair telephone carrier systems.

BACKGROUND OF THE INVENTION

Telecommunications systems for transmitting voice and data to and from subscribers (i.e., residences and businesses) are known. An exemplary telecommunications system 10 is schematically shown in FIG. 1. The system 10 includes a Main Distribution Frame 12 (MDF) for connecting digital subscriber lines 13 (DSLs) to internal lines 14 within a telephone server's central office 15. The central office 15 frequently includes a DSLAM 18 (Digital Subscriber Line Access Multiplexer) and a voice switch 19. The DSLAM 18 transmits data to and receives data from a communications network/backbone 21. The voice switch 19 transmits voice signals to and receives voice signals from a communications network/backbone 23. The networks 21 and 23 can be dedicated lines that are part of the same network. POTS splitter devices 16 (i.e., Plain Old Telephone Service splitter devices) are used at the central office 15 to combine data signals from the DSLAM 18 with voice signals from the voice switch 19. By combining the signals, the signals can be simultaneously routed to a subscriber 25 through a single DSL 13. Signals transmitted from subscribers 25 to the central office 15 are also routed through the POTS splitter devices 16. At the POTS splitter devices 16, the signals are split and directed to the DSLAM 18 and the voice switch 19. Typically, the splitter devices 16 include low pass filters for removing the data content from any signals transmitted from the splitter devices 16 to the voice switch 19. Since DSLAMs 18 frequently include high pass filters for removing the voice band, the splitter devices 16 usually do not include filters for filtering the voice content from the signals transmitted to the DSLAM 18.

For most telecommunications systems, it is desirable to maximize the splitter densities. To maximize splitter densities, multiple splitters can be mounted on a printed circuit board to form a splitter card. To further maximize splitter densities, multiple splitter cards can be mounted within the same chassis.

It is desirable to be able to easily test the communication lines of a telecommunications system to identify errors and to determine whether existing lines are ADSL compatible (i.e., a process known as loop qualification). What is needed is a test access device that provides ready test access to communication lines.

SUMMARY OF THE INVENTION

One aspect of an embodiment of the present invention relates to a splitter card having integral test access devices. The splitter card allows test access to be readily provided at any location where splitter cards are typically mounted (e.g., a splitter chassis).

A variety of other aspects of the invention are set forth in the description that follows, and in part will be apparent from the description, or may be learned by practicing the invention. The aspects of the invention relate to individual features as well as combinations of features. It is to be understood that both the foregoing general description and the following detailed description are exemplary and explanatory only and are not restrictive of the invention as claimed.

Figure 1:
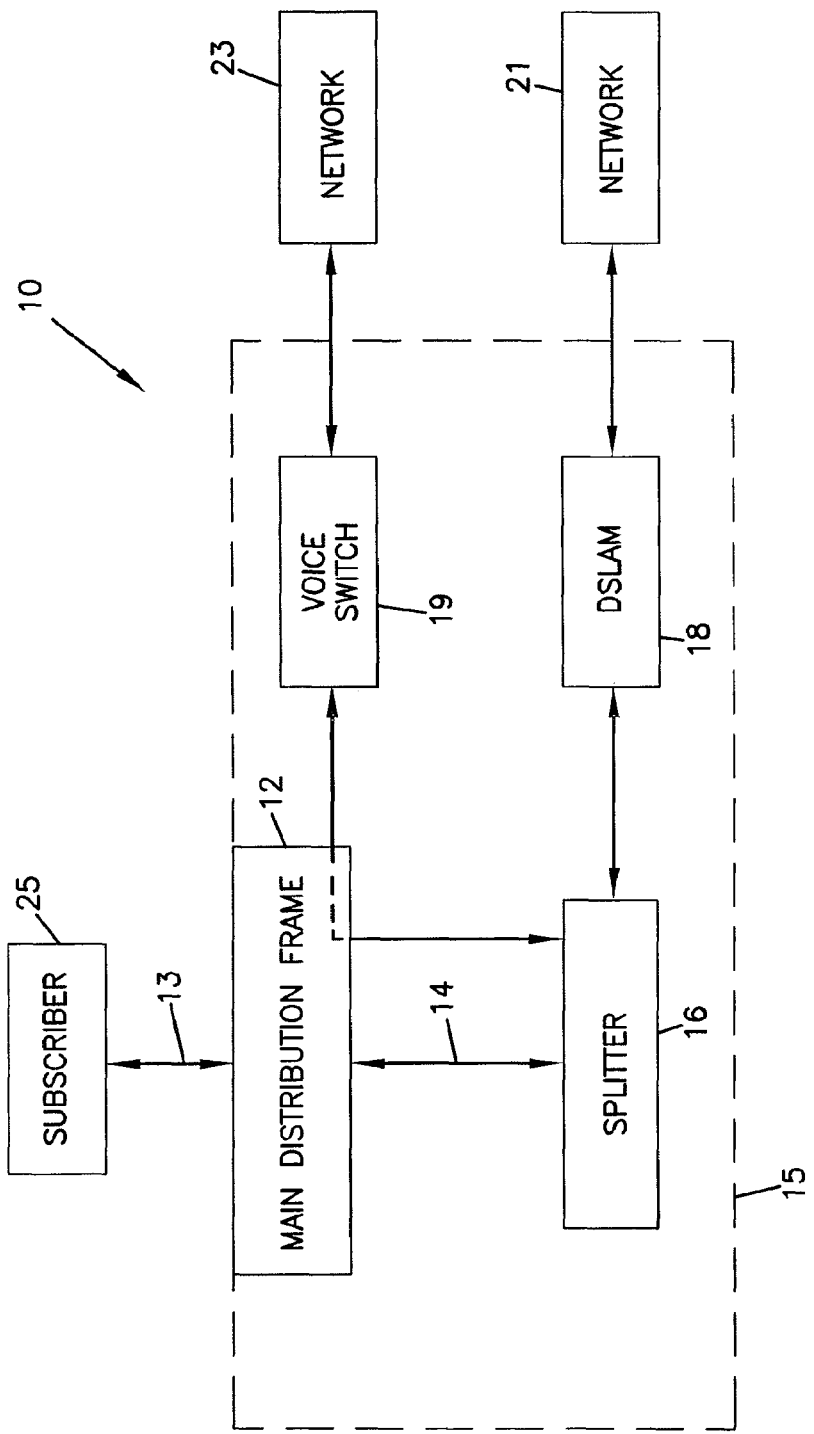
FIG. 1 is a diagram of an exemplary telecommunications system.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and structural and functional changes may be made without departing from the scope of the present invention.

It will be appreciated that the various aspects of the present invention are applicable to a variety of telecommunications service options including, among other things, ADSL (Asymmetric Digital Subscriber Line), IDSL (Integrated Services Digital Network DSL), SDSL (Symmetric DSL) and VDSL (very high speed DSL) services.

I. Exemplary Splitter Unit

Figure 2:
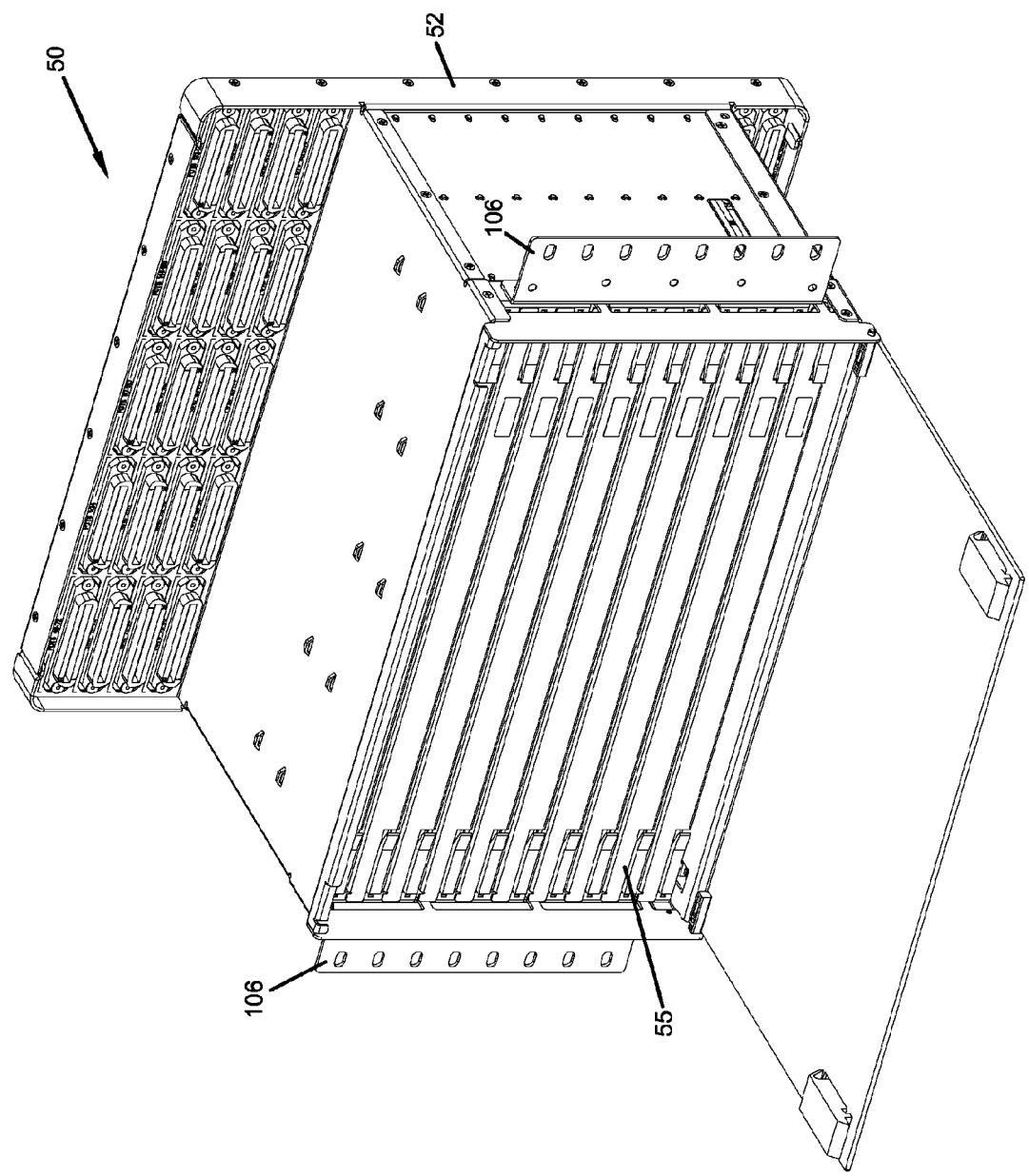
FIG. 2 is a perspective view of a splitter unit including a chassis that is shown fully loaded with splitter cards.
Figure 3:
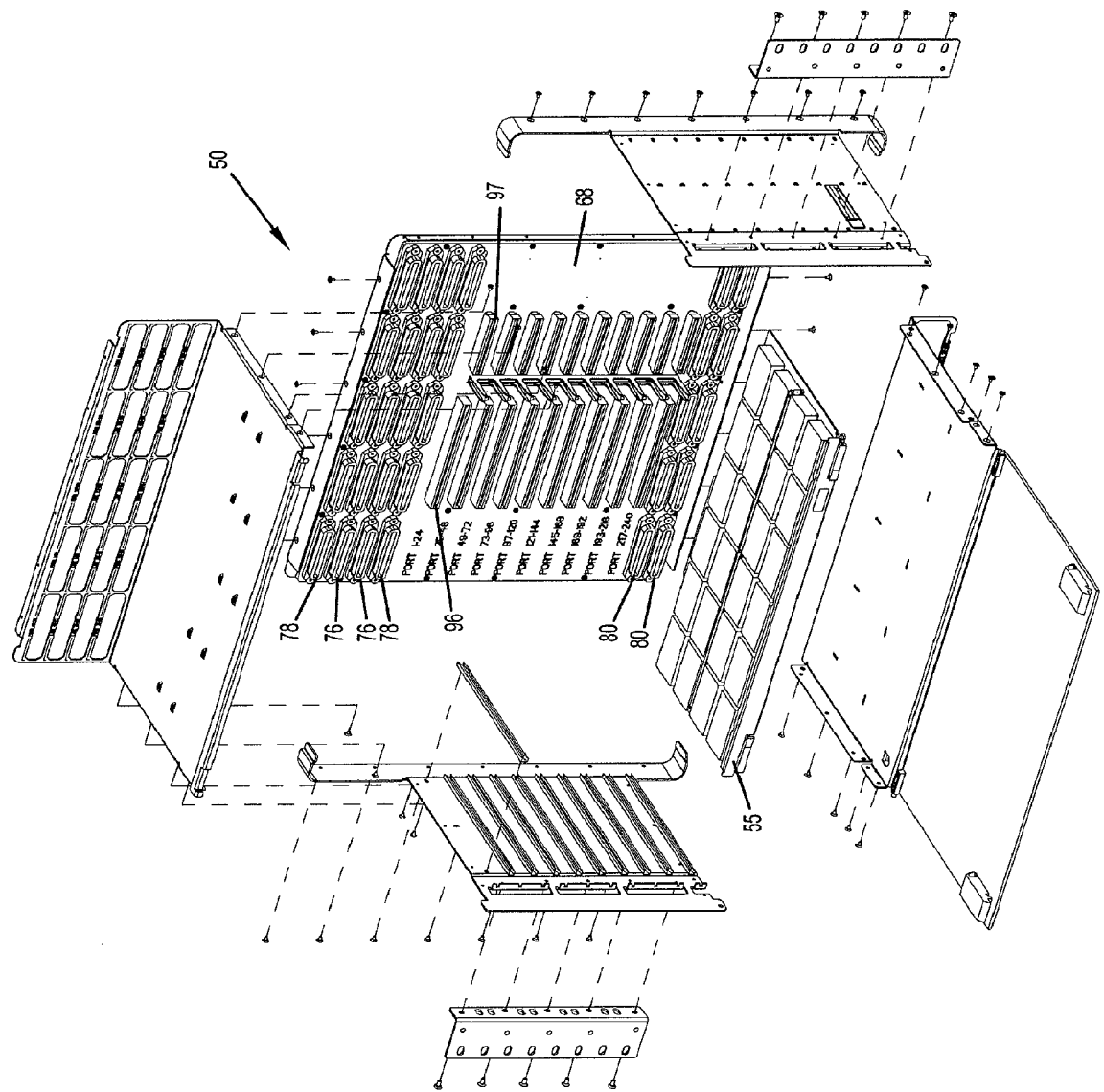
FIG. 3 is an exploded view of the splitter unit of FIG. 2.

FIGS. 2 and 3 illustrate a splitter unit 50 that is an example of the type used at a telephone server's central office. The splitter unit 50 includes a chassis 52 for housing a plurality of splitter cards 55. The chassis 52 includes mounting flanges 106 for allowing the splitter unit 50 to be fastened (e.g., by screws or bolts) to a conventional rack or cabinet.

As best shown in FIG. 3, the splitter unit 50 includes LINE connectors 76, POTS connectors 78 and DATA connectors 80. The LINE connectors 76 can be used to provide interface locations for allowing the splitter unit 50 to interface with outside lines such as digital subscriber lines 13 (see FIG. 1). The POTS connectors 78 can be used to provide interface locations for allowing the splitter unit 50 to interface with a voice switch such as voice switch 19 (see FIG. 1). The DATA connectors 80 can be used to provide interface locations for allowing the splitter unit 50 to interface with a DSLAM such as DSLAM 18 (see FIG. 1). The splitter unit 50 further includes first card edge connectors 96 and second card edge connectors 97 for providing an electrical interface between the splitter unit 50 and the splitter cards 55. A backplane board 68 (shown in FIG. 3) electrically connects the POTS and LINE connectors 76 and 78 to the card edge connector 96, and also electrically connects the DATA connectors to the card edge connector 97. In a non-limiting embodiment, the connectors 76, 78 and 80 can be RJ-21 connectors for use in providing connections with corresponding connectors provided on cables such as 25-pair twisted pair cables.

Figure 4:
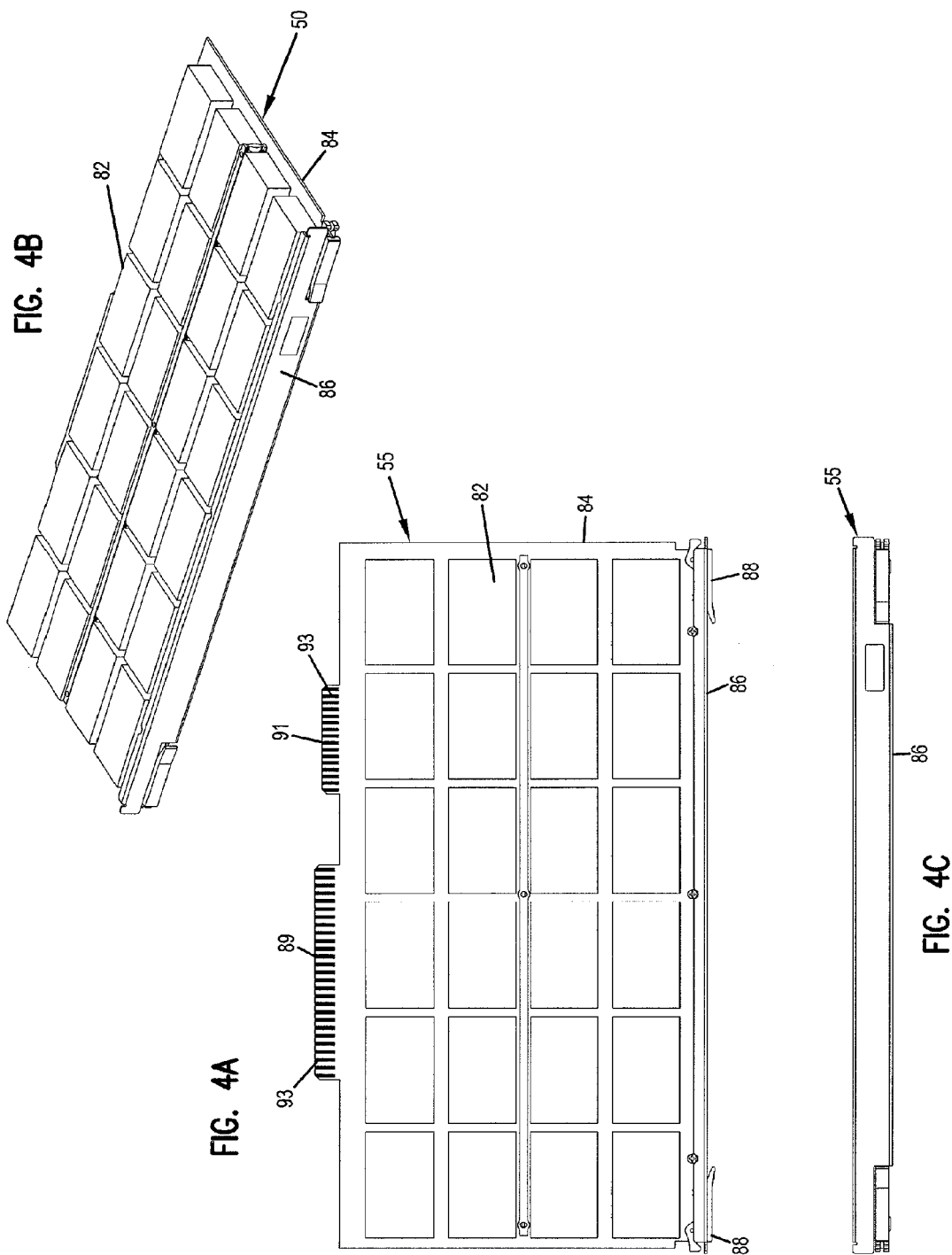
FIG. 4A is a plan view of one of the splitter cards of the splitter unit of FIG. 2.
FIG. 4B is a front perspective view of the splitter card of FIG. 4A.
FIG. 4C is a front view of the splitter card of FIG. 4A.

Referring now to FIGS. 4A-4C, one of the splitter cards 55 is shown in isolation from the splitter chassis 52. The depicted splitter card 55 includes a plurality of splitters 82 (e.g., 24 splitters) mounted on a circuit board 84. The card 55 also includes a front face plate 86 mounted to a front edge of the circuit board 84. Retaining latches 88 are located at left and right edges of the face plate 86 for retaining the splitter card 55 within the chassis 52. The card 55 also preferably includes first and second card edge extensions 89 and 91 (i.e., card edge connectors) located adjacent a rear edge of the circuit board 84. Preferably, electrical contacts/pads 93 are located on both the top and bottom sides of the card edge extensions 89 and 91. Tracings (not shown) on the circuit board 84 electrically connect the pads 93 to the splitters 82. When the card 55 is fully inserted in the chassis 52, the extensions 89 and 91 are respectively received in the first and second card edge connectors 96 and 97 to provide an electrical interface between the splitter card 55 and the splitter chassis 52.

The splitters 82 of the splitter unit 50 can have a number of different configurations. For example, the splitters 82 can include conventional POTS splitter circuits. A conventional POTS splitter circuit functions to split a signal (e.g., a signal from a DSL) into two signals. One of the split signals is typically passed through one or more low pass filters capable of passing the relatively lower frequency voice content of the signal (e.g., less than about 4 kilohertz) and rejecting the signal content above the voice band (e.g., 30 kilohertz and above). This "voice-only" signal can then be transmitted from the splitter 82 to a voice switch such as voice switch 19. The other split signal can be transmitted from the splitter 82 to a DSLAM such as DSLAM 18. For such an embodiment, it is assumed that the DSLAM or other digital multi-plexer that ultimately receives the composite signal will provide any required high-pass filter elements to remove the relatively low frequency voice signal content of the composite signal. In other embodiments, high pass filtration can be done at the splitter 82. It will further be appreciated that ISDN (Integrated Services Digital Network) filter circuits could also be used. Exemplary splitters/combiners incorporating low pass filters are sold by Vacuumschmelze GMBH of Germany.

It will be appreciated that signals are transmitted bi-directionally through the splitters 82. Signals transmitted from DSLAMs and voice switches to the splitters 82 are combined at the splitters 82 such that the signals can be simultaneously routed to a subscriber 25 through a single DSL 13.

Figure 5:
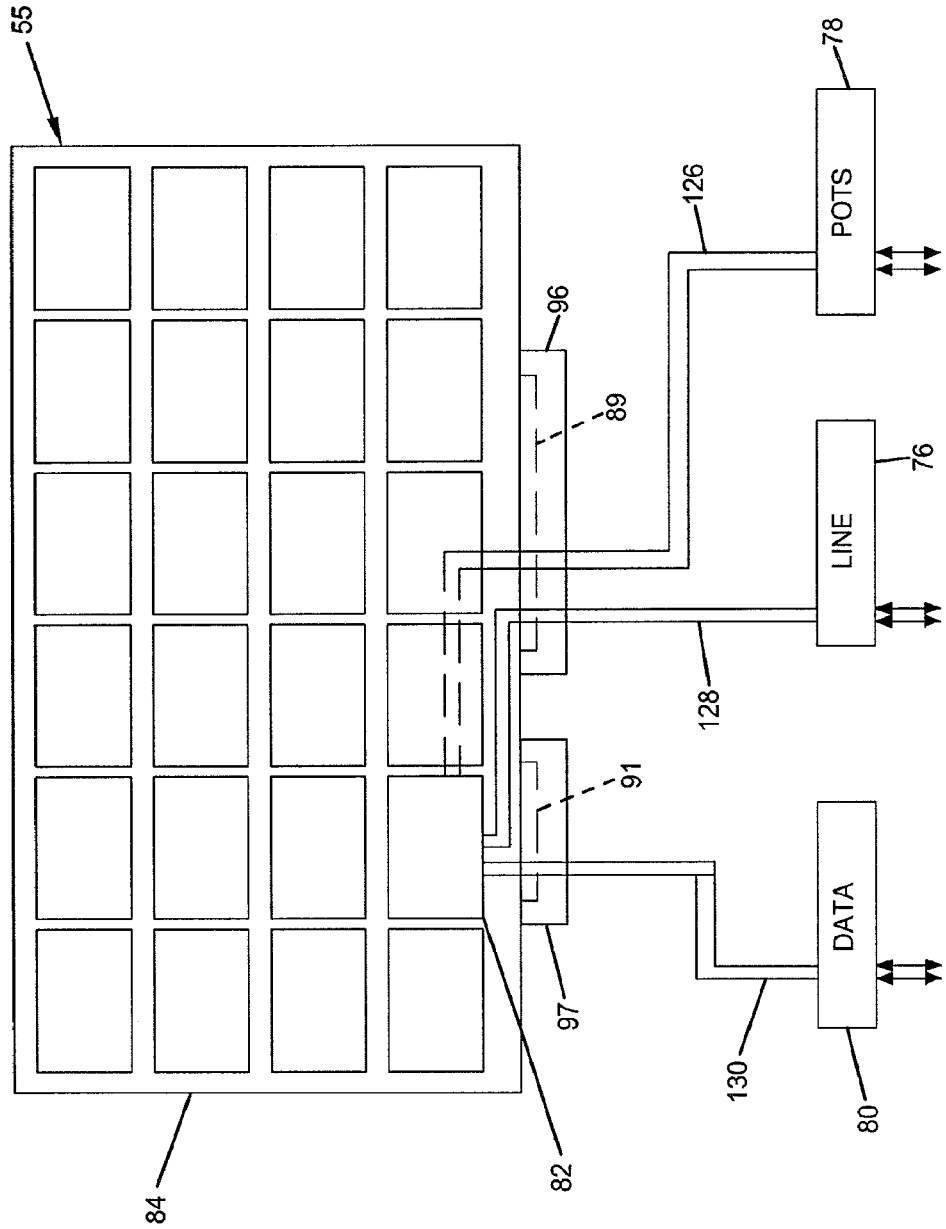
FIG. 5 is a schematic diagram of one circuit of the splitter unit FIG. 2 showing how a splitter card interfaces with the splitter chassis.

FIG. 5 schematically shows the interface between the splitter chassis 52 and one of the splitter cards 55. In FIG. 5, only one twisted pair circuit/channel is shown. It will be appreciated that similar circuits/channels are preferably provided for each of the remaining splitters.

In FIG. 5, the splitter card 55 is shown connected with card edge connectors 96 and 97. With the interface between the splitter card 55 and the card edge connectors 96 and 97, LINE signals (e.g., signals from a DSL) inputted through LINE connector 76 are directed through tracings 128 of backplane board 68 to card edge connector 96. From card edge connector 96, the signal is conveyed to splitter 82 of splitter card 55. At splitter 82, the LINE signal is split into separate VOICE and DATA signals. The VOICE signal is directed back through card edge connector 96 to tracings 126 of the backplane board 68. Tracings 126 carry the VOICE signal to POTS connector 78 where the VOICE signal is output from the splitter unit 50 to a component such as voice switch 19. The DATA signal is directed from splitter 82 to card edge connector 97. From card edge connector 97, the DATA signal is carried by tracings 130 of backplane board 68 to DATA connector 80. At DATA connector 80, the DATA signal is output from the splitter unit 50 to a component such as DSLAM 18. Signals traveling in the reverse direction through the splitter card 55 (i.e., signals input through the POTS and DATA connectors 78 and 80 from the voice switch and DSLAM) are combined at the splitters 55 and output through the LINE connector 76 (e.g., to a DSL).

II. Splitter Card with Integral Test Access

Figure 6:
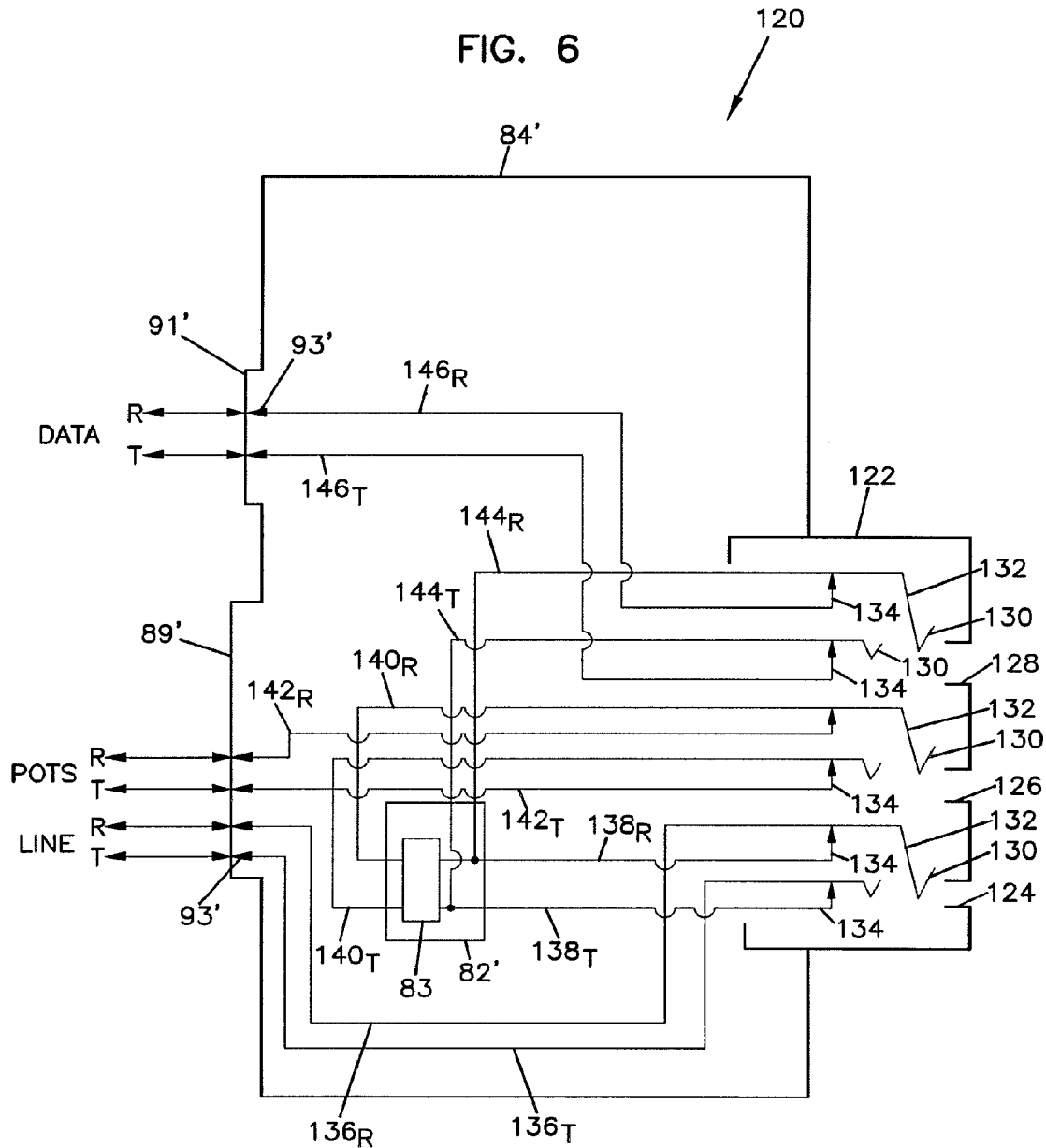
FIG. 6 is a schematic diagram of a splitter card with test access in accordance with one aspect of the present invention.

FIG. 6 schematically shows a splitter card 120 constructed in accordance with the principles of the present invention. The splitter card 120 includes a circuit board 84' on which a plurality of POTS splitters 82' are mounted (only one splitter is shown in FIG. 6). The splitter card 120 also includes test access devices 122 (only one shown in FIG. 6) that provide test access to signals being transmitted through the splitter card 120. The test access devices are preferably integral with the splitter card 120 (i.e., the circuit board 84', the splitters 82' and the test access devices 122 form a single unit). While the preferred embodiment includes POTS splitters, ISDN splitters could also be used.

The circuit board 84' preferably has a similar configuration to the circuit board 84 previously described. For example, the circuit board 84' includes card edge connectors in the form of first and second card edge extensions 89' and 91'. Preferably, electrical contacts/pads 93' are located on both the top and bottom sides of the card edge extensions 89' and 91'. As will be described in greater detail later in the specification, circuitry (i.e., electrically conductive components such as tracings) electrically connects the pads 93' to the splitters 82' and the test access devices 122. The circuit board 84' is sized to fit within the splitter chassis 52 of FIGS. 2 and 3. By inserting the splitter card 120 within the chassis 52, the extensions 89' and 91' are respectively received in the first and second card edge connectors 96 and 97 of the chassis 52. As so inserted, the pads 93' engage contacts of the card edge connectors 96 and 97 to provide an electrical interface between the splitter card 120 and the splitter chassis 52.

For clarity, only one splitter 82' and one test access device 122 are shown mounted on the circuit board 84'. However, it will be appreciated that a plurality of POTS splitters 82' and a plurality of test access devices 122 are preferably provided. For example, when used in combination with the chassis 52, the circuit board 84' is preferably equipped with 24 POTS splitters 82' and 24 test access devices 122. Each of the test access devices 122 preferably has three ports for providing test access to the LINE signal, the POTS signal and the DATA signal of each circuit or channel of the splitter card 120. It will be appreciated that the number of splitters 82' and the number of test access devices 122 can be varied to be compatible with a particular splitter chassis.

The POTS splitters 82' of the splitter card 120 preferably have the same configuration as the POTS splitters 82 previously described with respect to the splitter card 55. As shown in FIG. 6, the depicted splitter 82' includes a low pass filter 83 used to remove the data frequency band of a signal. In use of the splitter card 120, a LINE signal transmitted to the splitter card 120 from a DSL (see DSL 13 of FIG. 1) is split within the POTS splitter 82'. One part of the split signal is passed through the low pass filter then output from the splitter card 120 as a POTS signal. The other part of the LINE signal is not filtered and therefore retains the content of the signal corresponding to the data frequency band. This part of the signal is output from the splitter card 120 as a DATA signal. Frequently, the low frequency voice content of the DATA signal can be filtered at a downstream location such as at a DSLAM. DATA and POTS signals transmitted to the splitter card 120 from components such as a DSLAM or a voice switch (see DSLAM 18 and voice switch 19 of FIG. 1) are combined at the splitter 82' and output from the splitter card 120 as a LINE signal.

The test access devices 122 of the splitter card 120 can include normally-through bantam jacks. As shown in FIG. 6, the depicted bantam jack defines three ports which include a LINE port 124, a POTS port 126 and a DATA port 128. Each of the ports 124-128 is sized for receiving a tip and ring plug, and each includes a corresponding tip spring 130 and ring spring 132. The tip and ring springs 130 and 132 normally engage corresponding normal contacts 134. Thus, when no plug is inserted in a given port 124-128, the tip and ring springs 130 and 132 engage their corresponding normal contacts 134 such that the circuits are closed. However, when a tip and ring plug is inserted within one of the ports 124-128, the plug engages the tip and ring springs 130 and 132 corresponding to the port causing the tip and ring springs 130 and 132 to be biased away from their corresponding normal contacts 134. In this manner, any signal being conveyed between the tip and ring springs 130, 132 and the normal contacts 134 is interrupted and routed through the plug inserted within the corresponding port. With the plug inserted in the port, the tip spring 130 of the port engages the tip of the plug and the ring spring 132 of the port engages the ring of the plug. As is conventionally known in the art, the bantam jacks also preferably include sleeve grounds (not shown).

In use of the splitter card 120, the splitter card 120 is inserted within the chassis 52 of the splitter unit 50. As so inserted, LINE signals input to the splitter unit through one of the LINE connectors 76 enters the splitter card 120 through the first card edge extension 89'. From the first card edge extension 89', the LINE signal travels through tracings $136_T$ and $136_R$ to the tip and ring springs 130, 132 of the LINE port 124. In the absence of a plug in the LINE port 124, the signal travels from the tip and ring springs 130, 132 to their corresponding normal contacts 134. From the normal contacts 134, tracings $138_T$ and $138_R$ convey the signal to POTS splitter 82'. At the POTS splitter 82', the signal is split into a POTS signal and a DATA signal. The POTS signal passes through the low pass filter 83 of the splitter 82' and is carried by tracings $140_T$ and $140_R$ through the tip and ring springs 130, 132 of the POTS port 126. In the absence of a plug in the POTS port 126, the POTS signal travels through the tip and ring springs 130 and 132 to the corresponding normal contacts 134. From the normal contacts 134 tracings $142_T$ and $142_R$ convey the POTS signal back to the first card edge extension 89'. From the first card edge connection 89', the POTS signal is output from the splitter unit 50 through one of the POTS connectors 78.

The DATA signal by-passes the low pass filter 83 of the splitter 82' and is carried from the POTS splitter 82' to the tip and ring springs of the DATA port 128 by tracings $144_T$ and $144_R$. In the absence of a plug in the DATA port 128, the DATA signal is carried from the tip and ring springs 130 and 132 of the DATA port 128 to the corresponding normal contacts 134. From the normal contacts 134 of the DATA port 128, the signal is carried to the second card edge extension 92' by tracings $146_R$ and $146_T$. The DATA signal is then preferably output from the splitter unit 50 through one of the DATA connectors 80.

The above paragraphs describe the path of signals traveling from the LINE connectors 76 to the POTS and DATA connectors 78 and 80. It will be appreciated that signals traveling from the POTS and DATA connectors 78 and 80 to the LINE connectors 76 travel along the same path, but in an opposite direction.

It will also be appreciated that the splitter card 120 of FIG. 6 is but one example of the present invention. In other embodiments, the configuration of the structure for providing an electrical interface with the chassis 50 can be modified. For example, a single card edge extension could be used. Alternatively, female connectors could be mounted on the circuit board 84 for providing an interface with a chassis. Moreover, the size of the circuit board 184 can be varied to correspond to the size of a chassis in which the card is intended to be inserted. Further, the test access devices may be configured to provide test access to only the LINE signals, only the DATA signals or only the POTS signals (i.e., fewer than 3 access ports can be provided per channel if desired).

Figure 7:
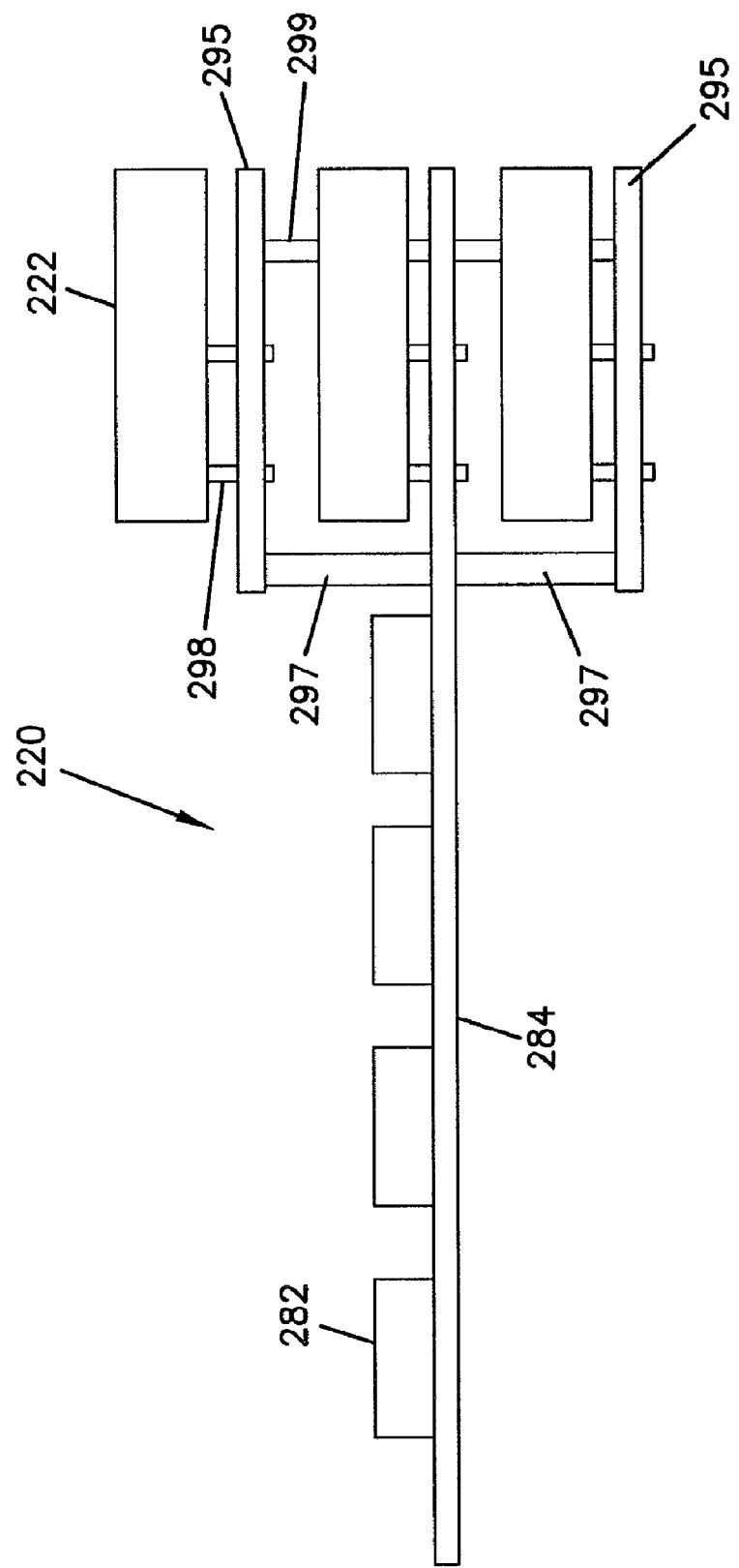
FIG. 7 shows another splitter card with test access in accordance with the principles of the present invention.

FIG. 7 shows another embodiment of a splitter card 220 constructed in accordance with the principles of the present invention. The splitter card 220 includes a main board 284 having POTS splitters 282 mounted thereon. The POTS splitters 282 are preferably mechanically coupled to the main board 284. The splitter card 220 also includes two daughter boards 295 that are mechanically coupled to the main board 284. Test access devices 222 are mechanically coupled to the daughter boards 295 and the main board 284. Electrical connectors 297 provide electrical interfaces between the daughter boards 295 and the main board 284. Posts 299 can be used to stabilize the mechanical coupling between the daughter boards 295 and the main board 284.

As shown in FIG. 7, the test access devices 222 comprise bantam jacks having electrical contact pins 298 corresponding to each of the tip springs, ring springs and normal contacts located within the bantam jacks. The posts 298 are press fit within plated through holes defined by the main board 284 and the daughter boards 295. In this manner, the posts 298 provide both an electrical and mechanical coupling between the test access devices 122 and the circuit boards 284 and 295.

In the embodiment of FIG. 7, the splitter card 224 can include 24 different POTS splitters 282. The daughter boards 295 have been added to provide additional mounting space for mounting bantam jacks corresponding to each of the splitters 282. It will be appreciated that signals can be routed between the bantam jacks and the splitters in the same manner shown with respect to the embodiment of FIG. 6. Electrical connectors 297 provide a means for transferring signals between the main board 284 and the daughter boards 295.

As used herein, the phrase "mechanically coupled" includes situations where one component is connected directly to another component (e.g., by fasteners such as rivets, screws or pins or other means such as adhesive) and also includes situations in which one component is connected to another component by one or more intermediate members.

Figure 8:
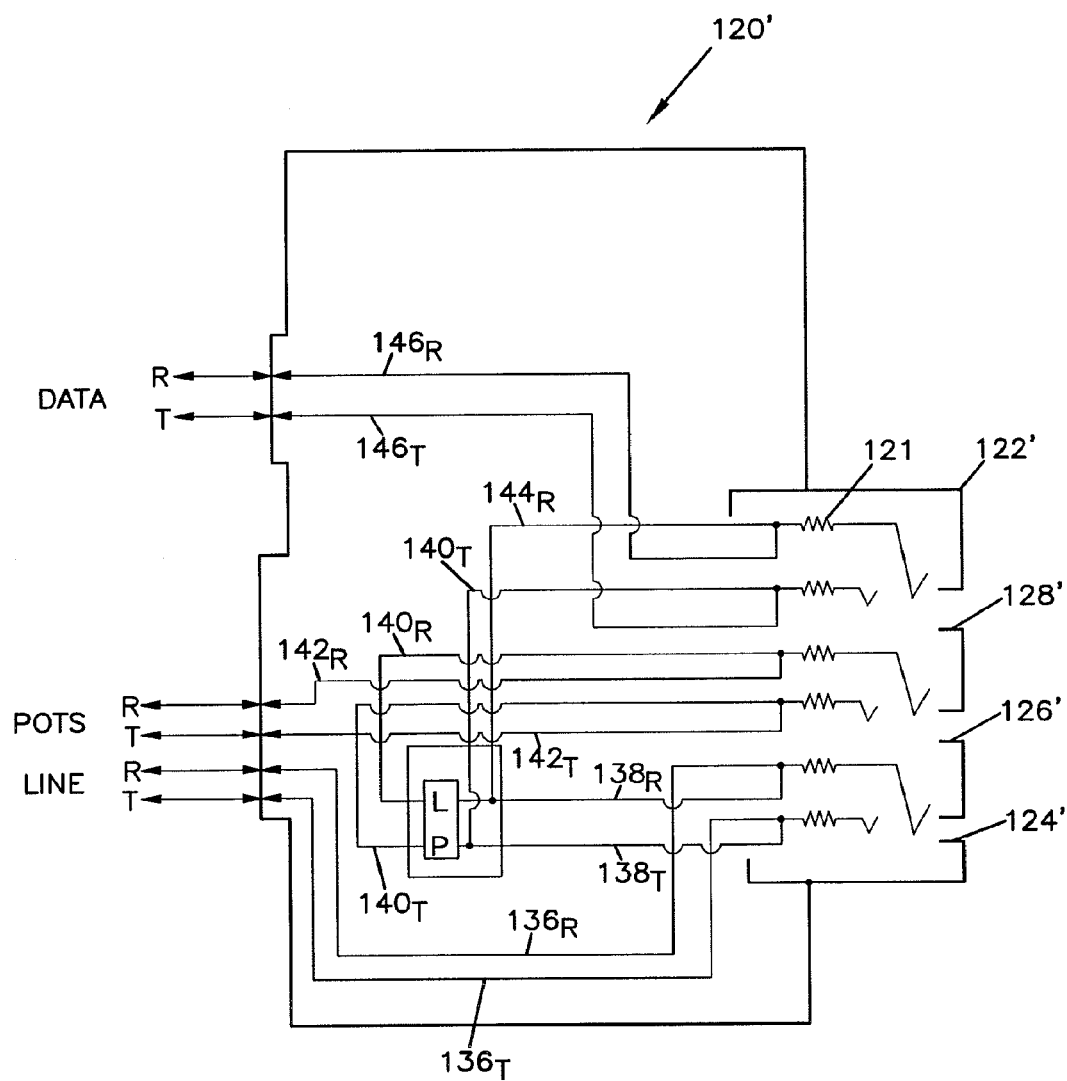
FIG. 8 illustrates a further splitter card with test access in accordance with the principles of the present invention.

The test device 122 of FIG. 6 can be referred to as an "intrusive" test device because when a plug is inserted within one of the ports 124-128, the corresponding signal being routed through the splitter card 120 is interrupted and routed through the plug. FIG. 8 shows a splitter card 120' having the same configuration as the splitter card 120 of FIG. 6 except the intrusive test access device 122 has been replaced with a non-intrusive test access device 122'. The non-intrusive test access device 122' allows the splitter card 120' to continuously function as a splitter even during testing procedures. The test access device 122' includes a LINE port 124', a POTS port 126' and a DATA port 128'. The test access device 122' is configured such that no signals are interrupted during testing. For example, when a plug is inserted within the LINE port 124', a continuous electrical connection is maintained between tracings $136_R$, $136_T$ and tracings $138_R$, $138_T$. Similarly, when a plug is inserted within the POTS port 126', a continuous electrical connection is maintained between tracings $140_R$, $140_T$ and tracings $142_R$, $142_T$. Moreover, when a plug is inserted within the DATA port 128', uninterrupted electrical connections are maintained between tracings $144_R$, $144_T$ and tracings $146_R$, $146_T$. When a plug is inserted within one of the ports 124'-128', rather than directing the entire signal through the plug, only a small portion of the signal is directed therethrough. Resistors 121 prevent the entire signal from being routed through the plug. In a preferred embodiment, the resistors have resistance in the range of 40-70 kilohms.

While the test access devices depicted above have primarily been described as bantam jacks for use with tip and ring plugs, it will be appreciated that any type of structure or connector for gaining access to signals routed through the splitter card could be used.

The above specification and examples provide a complete description of the manufacture and use of the invention. Since many embodiments of the invention can be made without departing from the spirit and scope of the invention, the invention resides in the claims hereinafter appended.

What is claimed is:

1. A method of providing test access for a telecommunications splitter card, the method comprising:
   mounting at least one splitter to a circuit board, the splitter including at least one circuit for providing access to voice data and digital subscriber line data;
   mounting a test access device to the circuit board so as to be carried by the circuit board; and
   providing non-intrusive test access to the voice data and the digital subscriber line data through the test access device.

2. The method of claim 1, further comprising coupling a board connector to the circuit board, the board connector being configured to allow the device to be electrically coupled to a splitter chassis.

3. The method of claim 2, further comprising coupling an edge connector to the circuit board.

4. The method of claim 1, further comprising accepting a connector to access the voice data and the digital subscriber line data.

5. The method of claim 4, further comprising accepting a tip and ring plug to access the voice data and the digital subscriber line data.

6. The method of claim 5, further comprising providing a bantam jack to accept the tip and ring plug to access the voice data and the digital subscriber line data.

* * * * *